Dec. 25, 1956     W. H. SILVER     2,775,182
RELEASABLE PLOW STANDARD
Filed Oct. 22, 1952     2 Sheets-Sheet 1
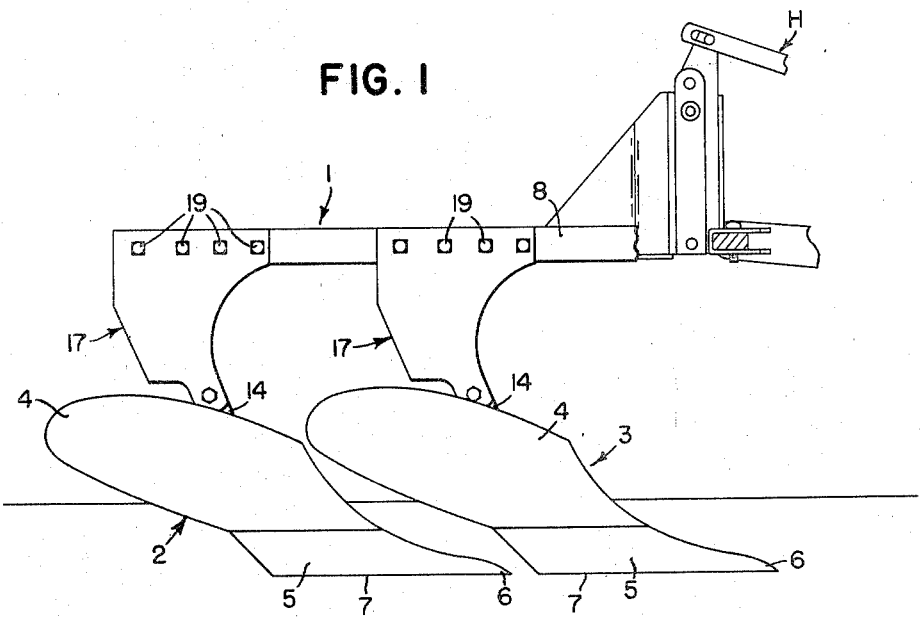
FIG. 1
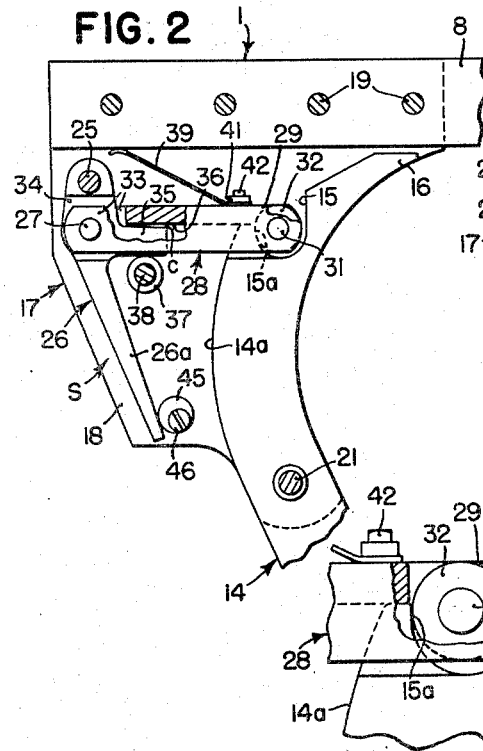
FIG. 2
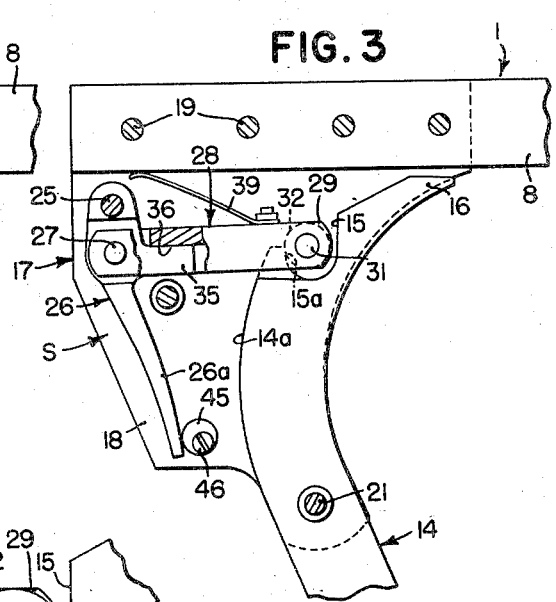
FIG. 3
FIG. 4
INVENTOR.
WALTER H. SILVER
BY
ATTORNEYS

INVENTOR.
WALTER H. SILVER
ATTORNEYS

United States Patent Office 2,775,182
Patented Dec. 25, 1956

2,775,182

RELEASABLE PLOW STANDARD

Walter H. Silver, Moline, Ill., assignor to Deere & Company, Moline, Ill., a corporation of Illinois Application October 22, 1952, Serial No. 316,147

10 Claims. (Cl. 97—47.89)

The present invention relates generally to agricultural implements, and more particularly to ground-working implements such as plows and the like having ground-working tool means operating below the surface of the ground, which tool means may be damaged by continued forward travel of the implement after one or more of the tool means encounters an obstruction, such as a large stone or boulder, stump, root or the like.

The object and general nature of the present invention is the provision of an agricultural machine of the ground-working type, such as a plow or the like, having overload release means so constructed and arranged that the ground-working tool is automatically released upon the occurrence of an overload of substantial magnitude. Heretofore, overload release devices have been constructed on what might be termed the toggle link principle; that is, in the operative position, the tool is held to its work by a mechanism equivalent to a toggle link arranged almost but not quite in a straight-line position, with the load-resisting means operating against the toggle joint at a mechanical advantage that is very great so long as the toggle linkage remains in its almost straight-line position. However, upon the occurrence of an overload of such magnitude that the toggle links begin to move toward their broken position, the mechanical advantage just mentioned rapidly decreases, providing thereby an overload release. Experience has shown, however, that overload releases of this type do not release at any very constant value. This is thought to be due to variations in the frictional resistance in the toggle joint and other factors, such as accumulations of dirt, dust, rust and the like at the toggle joint. Such variations, although per se relatively small, result in wide variations in the magnitude of the overload required to effect a release of the tool, because of the large multiplication of the effect of joint friction variations by the above-mentioned mechanical advantage present when the toggle linkage is in its almost straight-line position.

Specifically, therefore, it is an object of the present invention to provide an overload release mechanism which is so constructed and arranged that the reaction of the tool is taken substantially directly against a resisting force, such as a relatively heavy spring or the like, with substantially no mechanical advantage, with a simple but complete disconnection of the transmission of the tool reaction to the opposing spring means upon the initial occurrence of a movement of the force-resisting means. While such disconnecting means may, like the toggle joint mentioned above, be subjected to certain variations, due to dust, dirt and other factors, the presence of such variations in the disconnecting action does not to any appreciable extent affect the responsiveness of the relatively heavy force-opposing spring or the like. This is because the tool reaction is applied directly to the spring with no magnification of the variations in the releasing means.

In the preferred form of the invention the yielding of the force-opposing means, as under overload conditions, serves to effect a disconnection of the force-transmitting means between the tool and the force-opposing means, by a simple movement of one part relative to the other in a direction normal to the direction of the line of action of the tool reacting force.

These and other objects and advantages of the present invention will be apparent to those skilled in the art after a consideration of the following detailed description, taken in conjunction with the accompanying drawings.

In the drawings:

Figure 1 is a side view of a tractor-mounted plow in which the principles of the present invention have been incorporated, it being understood that the present invention is not necessarily limited, especially in its broader concepts, to plows or the like.

Figure 2 is an enlarged fragmentary detail view of one form of safety trip mechanism incorporated in the plow shown in Figure 1.

Figure 3 is a view similar to Figure 2 showing the position of the parts at the moment of release.

Figure 4 is an enlarged view showing the relation between the trip roller and the notched standard when the parts are in plowing position.

Figure 5:
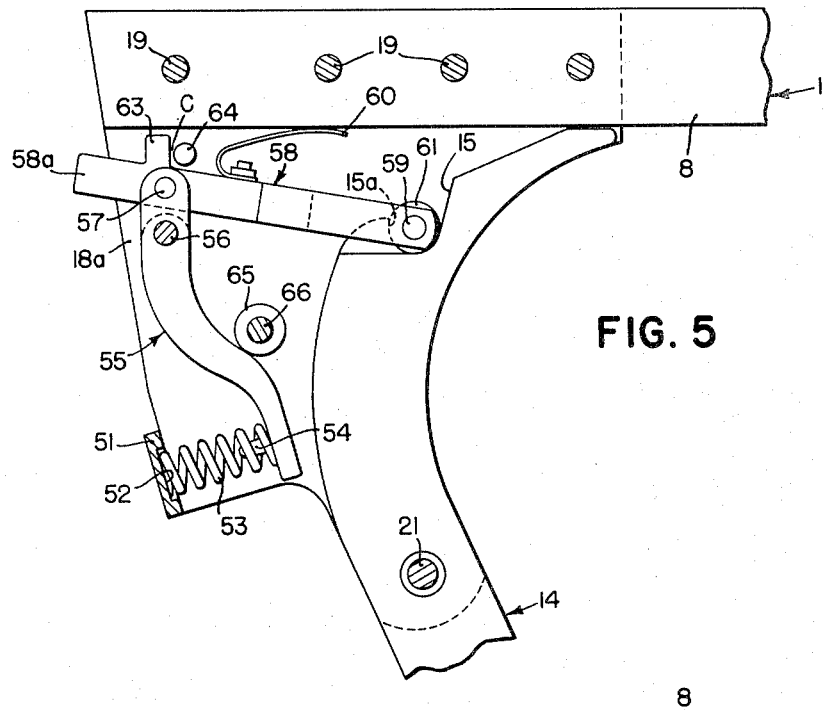
Figure 5 is a view similar to Figure 2, showing a modified form of the present invention.

Referring first to Figures 1–4, the present invention has been shown in these figures as incorporated in a two-bottom plow of the tractor-carried type, in which the tractor carries suitable hitch means H for receiving a plow frame 1 to which the plow bottoms 2 and 3 are rigidly connected. The plow bottoms 2 and 3 are of moldboard type and are identical, for all practical purposes, each including a moldboard 4 and a plowshare 5 having a forwardly extending plow point 6 and a generally rearwardly and forwardly extending cutting edge 7. Each plow bottom is mounted on the rear end of a generally fore-and-aft extending plow beam 8, the beams 8 forming the principal part of the frame 1.

Each of the plow bottoms 2 and 3 is fixed, as by a plurality of bolts or the like, to the lower end of a generally vertically extending plow standard 14. Each standard 14 comprises a generally vertically extending part curved, as best shown in Figure 2, and having a notch 15 and a forward extension 16 at its upper end. Secured to the rear end of each plow beam 8 is a bracket structure 17 in the form of a pair of depending bracket plates 18 secured along their upper edge portions by bolts 19 to the associated beams 8. The lowermost portions of the bracket plates 18 are apertured to receive pivot means 21 by which the associated plow standards 14 are pivotally connected to the bracket structure 17 for generally fore-and-aft swinging movement about a transverse axis. The bracket plates 18 are extended rearwardly beyond the upper end of the associated plow standard when in its normal position, providing thereby supporting means to receive the several parts of the safety trip mechanism S with which the present invention is more particularly concerned.

The bracket plates 18 of each bracket structure 17 are apertured to receive an upper pivot 25 upon which a spring arm 26 is swingably mounted. The upper portion of the arm 26, below the pivot 25, is apertured to receive a pivot 27 by which a link member 28 is pivotally connected with the arm 26. The forward end of the link member 28 is bifurcated, thereby providing two sections 29 which are apertured to receive a pin 31 upon which a roller 32, disposed between the sections 29, is mounted. The roller 32 is adapted to enter the notch 15 to a point such that the rear side of the roller engages the vertically disposed straight portion 15a at the rear side of the notch 15, as best shown in Figure 2. The rear end of the link 28, receiving the pivot 27, is also bifurcated, thereby providing sections 33 disposed on opposite sides of the arm 26, the latter being milled or otherwise formed at this point to provide a narrowed section 34. At this point, the arm 26 is provided with a forwardly disposed extension 35 that lies underneath an abutment section 36 formed on the link 28. The lower edge of the spring arm section 35 is adapted to engage a bushing 37 carried on one of the connecting bolts 38 that connect bracket plates 18 together. The roller 32 is normally held in the notch 15 by a relatively light leaf spring 39 having its rear end curved and disposed to engage the lower edge of the associated plow beam 8, the forward edge of the spring being fixed in place by a plate 41 and cap screw 42, or any other suitable means. It will be noted that the roller-receiving edge 15a of the notch 15 lies substantially at a right angle with respect to the axial line of the link 28; that is, the line extending to the centers of the pivots 27 and 31.

The lower end of the arm 26 as shown in Figure 2 is formed as a spring section 26a, the lower end of which bears against an eccentric abutment 45. The abutment is adjustable about a clamping screw 46 which, when tightened, securely holds the eccentric abutment 45 in position. When the parts are initially assembled during manufacture, as shown in Figure 2, the only adjustment necessary to be made in setting up the implement is to loosen the screw 46 and turn the abutment 45 until it just comes into engagement with the forward side of the spring arm section 26a at the moment that the lower edge of the section 35 engages the bushing 37. For proper over-all response, it is desirable to eliminate any looseness of the spring arm 26, and therefore, the part 45 is adjusted to engage the spring arm when the extension 35 engages the stop bushing 37. If initial tension or bias is desired, the part 45 may be rotated farther toward the spring arm after the extension 35 engages the abutment 37, thereby imparting a certain amount of initial bending to the spring section 26a.

The operation of this form of the invention is substantially as follows.

During normal operation, a tractor or the like pulls the plow through the ground and the reaction of the soil against each plow bottom tends to swing the standard 14 in a clockwise direction as viewed in Figure 2. Such rotation of the standard 14 is resisted by its link connection with the spring arm. That is, the roller 32 engages the straight portion 15a of the notch whereby there is no tendency for the roller to be forced out of the notch by the forces transmitted, and the tendency of the standard 14 to rotate in a clockwise direction is resisted by the link connection 28 with the spring arm at 27, the swinging of the arm 26 about the pivot 25 in a forward direction being limited by its engagement with the abutment 45. The extension 35 underlies the link abutment 36 with a relatively small clearance, shown at C in Figure 3. This clearance, while small, is sufficient to allow the flexing of the spring section 26a that occurs in normal operation.

If, however, the plow should strike an obstruction, such as a boulder or the like, the abnormal loading is transmitted by the roller and link to the spring arm 26, and the latter yields an amount that is more than sufficient to take up the clearance C. As soon as the extension 35 engages the lower edge of the abutment section 36 on the link 28, any further flexing of the spring section 26a causes the arm 26 to rotate in a counterclockwise direction, as viewed in Figures 2 and 3, and positively rocks the link 28 upwardly. When the parts reach the positions shown in Figure 3, the roller 32 is lifted out of contact with the rear edge 15a of the notch 15 and this immediately releases the plow standard 14 from its connection with the spring arm 26, thus freeing the plow bottom from the link 28. The plow bottom is then free to swing rearwardly and as the outfit continues to travel forwardly the plow passes harmlessly over the obstruction.

Tests have shown that after the parts are assembled and adjusted, the trip of the present invention operates at substantially constant overload with only negligible variations. This is due, first, to the fact that the load of the soil reaction is transmitted directly through a tension link to the resisting or force-opposing member, namely, arm 26. If this force exceeds a given value the resulting movement of the arm positively causes the release of the roller from the notch 15 by a direct action shifting the roller substantially at right angles to the line of transmitted force. Therefore, even though there may be some dirt, rust and the like on the surface 15a and/or the roller 32, these variable factors do not to any appreciable extent affect the responsiveness of the spring arm 26 to overload conditions.

After the link has been disconnected from the plow standard 14, as by the occurrence of an overload, the link 28 and its roller 32 remains substantially in the position shown in Figure 2, which facilitates the return of the standard 14 to its operative position, the roller 32 rolling along the rear edge 14a of the plow standard until it can drop into the notch 15, the link 28 being momentarily moved upwardly against the action of the relatively light spring 39 as the roller 32 approaches the notch 15.

While in the form of the invention shown in Figure 2 the arm 26 has been illustrated as incorporating an integral spring section 26a, it will be understood that the present invention may with substantially equal facility be incorporated in a construction wherein the arm and spring section are separate parts. This is the construction shown in Figure 5, which construction will now be described.

In the form of the invention shown in Figure 5, the plow frame and plow standard are substantially the same as those described above, and hence the same reference numerals have been employed. The bracket structure is slightly different and comprises a pair of bracket plates 18a supporting at their lower rear edges a cross piece 51 provided with a socket 52 receiving the rear end of a coil spring 53. The front end of the spring 53 seats over a projection 54 on the lower end of a spring arm 55, the upper end of which is swingably mounted on a pivot 56 supported by the bracket plates 18a. The arm 55 extends above the pivot 56 and is apertured to receive a pin 57 on which the rear end of a link 58 is carried. The forward end of the link 58, which may be made up of laterally spaced sections, is apertured to receive a pivot 59 on which a roller 61 is mounted. The roller 61 is adapted to enter the notch 15 of the plow standard 14 in substantially the same manner as described above in connection with the form of the invention shown in Figures 1 and 2. The rear edge 15a of the notch extends at right angles to a line connecting the centers of the pivots 57 and 59, the edge 15a extending slightly above the aforesaid line.

The rear end of the link 58 is provided with an extension 63 that is disposed in a generally vertical position lying above the pivot 57, and engageable with a stop pin 64 upon the occurrence of an overload, there normally being a slight clearance, as at C, between the extension 63 and the stop pin 64. A stop bushing 65 is mounted on a bracket-connecting bolt 66 and serves as a stop preventing the forward displacement of the arm 55 under the action of the compression spring 53.

Figure 6:
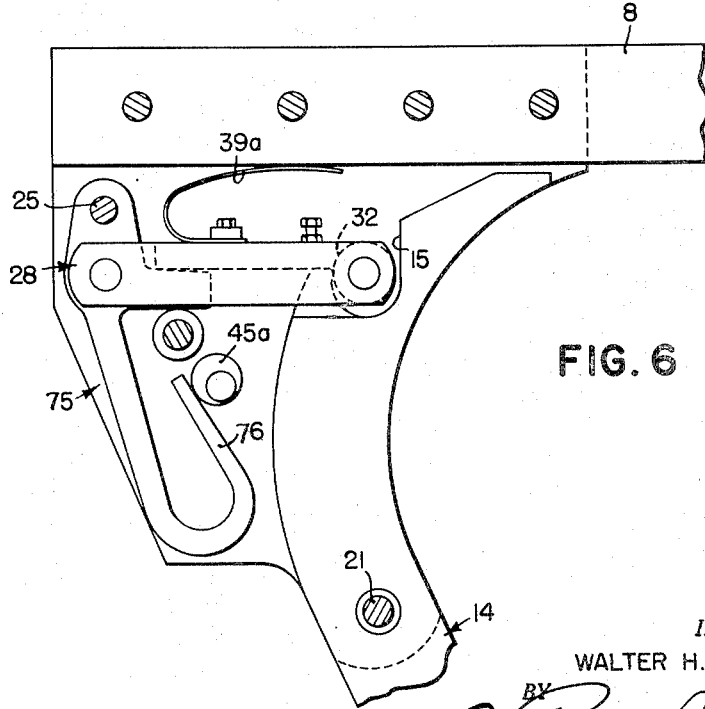
Figure 6 shows another modification of this invention.

The operation of the form of the invention shown in Figure 5 is substantially like that described above in connection with Figure 2. Upon the occurrence of an overload, the standard 14 swings rearwardly, which acts through the link 58 to swing the arm 55 in a clockwise direction, compressing the spring 53. However, as the link 58 moves forwardly during this action, the extension 63 engages the stop pin 64, and after this occurs a slight forward additional movement of the link 58 will cause the latter to rock about the pin 57 in a counterclockwise direction, immediately freeing the roller 61 from the notch 15 and thereby releasing the standard 14 from the trip mechanism. During the restoring movement of the standard 14, the roller 61 rides along the rear curved edge 14a of the standard 14. If desired, a spring 60 may be mounted on the link 58, like the spring 39, to insure reentry of the roller 61 into the notch 15. The link 58 has a rearward extension 58a by which the link may be released manually from the standard 14 whenever it may be desired to do so, as for changing plowshares or the like. When releasing the link 58 in this way, the only force that must be overcome is the relatively light A further modified form of the present invention is shown in Figure 6. This form of the invention is substantially the same as the form shown in Figures 1–4 except that a spring arm 75 is provided with an elongated curved extension 76 by which greater resilience is secured, as compared with the arm 26 described above. The curved end 76 acts against an eccentric abutment 45a which is substantially the same as the abutment 45 but located in a different position. Also, in this form of the invention, the light spring 39a is shaped differently, having a reverse curvature so that the end of the spring that engages the underside of the associated plow beam A lies a considerable distance from the spring arm pivot 25. The other end of the spring 39a is fixed to the link 28 by substantially the same means that, in the form of the invention shown in Figures 1–3, fixes the inner end of the spring 39 to the associated link 28.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. A safety device for a ground working tool that is movably connected with a support, said device comprising a link, releasably connectible with said tool, a spring-biased arm pivotally connected with said link and receiving thereby the reaction of the force transmitted by said tool to said link, an extension carried by said link in rigid relation therewith and disposed adjacent the pivotal connection between said arm and said link, said extension being disposed generally normal to said link, and a fixed abutment disposed on said support in a position to engage said extension when said link is shifted, as by yielding of said spring biased arm, and thereby swing said link out of engagement with said tool.

2. In a ground working means, a supporting bracket, a tool standard pivoted to said bracket, an arm pivotally connected adjacent one end with said bracket, a link pivotally connected at one end with said arm substantially at said one end of the arm, said standard having a notch thereon, force transmitting means carried by the other end of said link and releasably engageable in said notch, resisting spring means connected with the other end of said arm, an extension disposed generally normal to said link and extending outwardly from the latter adjacent the pivot connection of said link with said arm, and an abutment on said bracket engageable by said extension, when said link and arm shift under overload conditions, and acting to disengage said force transmitting means from said standard.

3. The invention set forth in claim 2, further characterized by an abutment on said bracket engaged by said arm for limiting movement of the latter under conditions in which said tool standard is subject to loads less than an overload.

4. The invention set forth in claim 2, further characterized by spring means connected to act between said bracket and said link at a point on the latter between said one end and said force transmitting means for yieldably holding the latter in said notch, and means on said link adjacent said one end for shifting the link so as to release said force transmitting means from said notch.

5. The invention set forth in claim 4, further characterized by said last mentioned means comprising a part extending outwardly from said bracket to provide for manual operation of said link.

6. A trip standard for plows and the like comprising the combination of a beam, a bracket structure including a pair of bracket plates fixed along their upper edges to said beam at opposite sides thereof, a tool standard pivoted to the lower portions of said bracket plates and extending upwardly between said plates, the upper end of said standard having an upwardly facing notch, a spring biased arm disposed between said bracket plates and pivoted to at least one of said plates, a link disposed between said bracket plates and pivoted adjacent one end to said arm and at the other end having notch-entering means, spring means disposed between said bracket plates and connected to act between said link and said beam for releasably holding said notch-entering means in said notch, and means acting against said link when said spring biased arm yields to release said link from said standard.

7. In a ground working means, a supporting bracket, a tool standard pivoted to said bracket, an arm pivotally connected adjacent one end with said bracket, a link pivotally connected at one end with said arm substantially at said one end of the arm, said standard having a notch thereon, force transmitting means carried by the other end of said link and releasably engageable in said notch, resisting spring means connected with the other end of said arm, abutment means carried by said supporting bracket, and means on the link disposed to engage said abutment means when said spring means yields and permits said link to shift, whereby said abutment means acts to move said link and disengage said force transmitting means from said standard.

8. A trip standard for plows and the like comprising the combination of a beam, a bracket structure including a pair of bracket plates fixed along their upper edges to said beam at opposite sides thereof, a tool standard pivoted to the lower portions of said bracket plates and extending upwardly between said plates, a spring biased arm disposed between said bracket plates and pivoted to at least one of said plates, a link disposed between said bracket plates and pivoted adjacent one end to said arm and at the other end having releasable standard-engaging means, spring means disposed between said bracket plates and connected to act against said link for releasably holding the latter engaged with said standard, means acting against said link when said spring biased arm yields to release said link from said standard, and a part connected with said link and extending outwardly from between said brackets to provide for manual operation of said link.

9. The invention set forth in claim 8, further characterized by said last mentioned part comprising the outer end portion of said link.

10. A safety device for a movably mounted ground-working implement, comprising a support, a tool-receiving standard pivoted to said support and having a notch, a spring biased arm pivoted to said support adjacent said standard, a link pivoted at one end to said arm and carrying standard-engaging means releasably disposed in said notch, abutment means, and means rigidly connected with said link and carrying a part engageable with said abutment means for moving said standard-engaging means out of engagement with said notch.

References Cited in the file of this patent

UNITED STATES PATENTS

| 1,078,871 | Olsen | Nov. 18, 1913 |
|---|---|---|
| 1,253,961 | Grimsrud | Jan. 15, 1918 |
| 1,808,478 | Printz | June 2, 1931 |

FOREIGN PATENTS

| 90,883 | Sweden | Nov. 23, 1937 |